Patented Oct. 12, 1954

2,691,643

UNITED STATES PATENT OFFICE 2,691,643

PREPARATION OF POLYPEPTIDES OF BETA-ALANINE

Joseph S. Chirtel and Arthur M. Mark, Chicago, Ill., assignors to Transparent Package Company, Chicago, Ill., a corporation of Illinois No Drawing. Application November 15, 1950, Serial No. 195,906

6 Claims. (Cl. 260—78)

This invention relates to the preparation of linear polypeptides.

The thermal polymerization of certain amino acids and derivatives thereof to form linear polypeptides is accompanied by varying degrees of decomposition which occurs when such amino acids or derivatives are heated to fusion temperatures under atmospheric pressures. Thus, we are aware that such derivatives as N-acetylglycine and N-acetyl-β-alanine decompose on application of heat at atmospheric pressures just above their melt temperatures.

The prior art likewise gives recognition to the thermal decomposition of β-amino acids to form ammonia and the corresponding unsaturated acid. For the case of β-alanine the reaction is stated to proceed in accordance with the following equation:

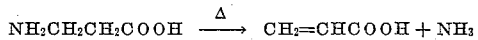

We have discovered that in accordance with the procedure of our invention, self-condensation of β-alanine, and amide forming derivatives of β-alanine, β-alanine alkyl esters, β-alanine amide, and mixtures of β-alanine an N-acetyl-β-alanine may be effected to produce water insoluble peptides and in surprisingly good yield. The polypeptides of our invention are in the form of horn-like solids, soluble in such solvents as cresols and xylenols and are useful as components in the preparation of synthetic edible films. They may also be used with additives such as plasticizers, fillers, and the like in forming synthetic edible films.

The reaction conditions for making the novel polymers of our invention depend somewhat on the character of the particular reactants. Where the reactants are of the group consisting of β-alanine alkyl esters and β-alanine amide the procedure, generally, comprises heating the reactant under atmospheric pressure to a temperature not substantially in excess of the boiling point of the reactant, until solidification occurs, and then heating the solidified material under superatmospheric pressure at a temperature of up to about 250° C., or at atmospheric or subatmospheric pressure, for a time sufficient to achieve substantial polymer formation.

When the reactants are such solid materials as β-alanine or mixtures of β-alanine and N-acetyl-β-alanine, the reactants are heated, under superatmospheric pressure and an inert atmosphere to a temperature not in excess of about 250° C. until the desired degree of polymer formation has occurred.

By following the procedure of our invention we have found that the expected destruction of these materials to acrylic acid and ammonia is inhibited to an astonishingly great degree, and that instead of decomposition of the reactants to ammonia and acrylic acid, we obtain excellent yields of poly β-alanine, having more than two β-alanine units per molecule.

The following examples which are presented for illustrative purposes disclose in detail the method, component steps, and conditions which are included within the scope of our invention.

EXAMPLE 1

Preparation of poly-β-alanine from β-alanine (atmospheric pressure)

A 0.2 mole (17.8 gm.) quantity of β-alanine was heated in a resin pot with agitation under a nitrogen atmosphere over an interval of 130 minutes between the temperature limits of 180 and 210° C. A complete melt was realized at 198° C. accompanied by the evolution of water, ammonia, and a higher boiling compound which solidified at 105° C. The reaction product, a yellowish, brittle mass, showed a weight loss of 4.47 gm. against a maximum of 3.6 gm. if only water were split off. Of the 8.0 gm. of crude product extracted with hot water, 2.53 gm. of insoluble residue was collected. The insoluble residue analyzed 17.7 per cent nitrogen. Yield was 31.6 per cent of hot water insoluble β-alanine peptides.

EXAMPLE 2

Preparation of poly-β-alanine from β-alanine (superatmospheric pressure)

A 6.0 gm. (0.0675 mole) quantity of β-alanine was placed in a glass-lined steel reactor which was then flushed with nitrogen and brought up to a positive pressure of 500 p. s. i. g. This pressure was maintained throughout a 5 hour heating period between the temperature limits of 205 and 215° C. A continuous bleed of nitrogen was employed in order to facilitate the removal of volatile condensation products.

An almost white, horn-like solid showing no visible signs of decomposition was removed from the glass liner. A total weight loss of 1.23 gm. was recorded against a theoretical loss of 1.21 gm. of water for complete condensation. The composite product analyzed 18.5% nitrogen.

A 4.45 gm. sample of the composite product was finely ground and then leached with five 100 ml. portions of hot (90° C.) distilled water. The hot water-insoluble residue was separated by centrifugation and dried in vacuo. Based upon the weight of sample washed, the 3.64 gm. yield of the white, amorphous solid corresponded to an 81.8% conversion to water insoluble poly-β-alanine having a nitrogen content of 19.2%. Theoretical total nitrogen for

19.7%. The water-soluble fraction on evaporation to dryness yielded a light, semi-crystalline residue which analyzed 16.0% nitrogen.

In order to characterize the water-insoluble residue as poly-β-alanine, a 0.97 gm. sample of the product was dissolved on heating in 20 ml. of 8 N. hydrochloric acid and refluxed over a 24 hour period. The solution was then evaporated to dryness, leaving a crystalline mass which was dried in vacuo at 100° C. The hydrolytic product, weighing 1.54 gm., analyzed 11.0% nitrogen compared with 11.15% for theoretical β-alanine hydrochloride.

EXAMPLE 3

*Preparation of poly-β-alanine from N-acetyl-β-alanine and β-alanine (atmospheric pressure)*

Quantities of β-alanine and N-acetyl-β-alanine in a 5:1 mole ratio (0.3 mole, 26.7 gm.: 0.06 mole, 7.86 gm.) were placed in a resin pot provided with an agitator and a means for maintaining an inert atmosphere of nitrogen. On application of heat the mix began to soften at 125° C. and at 170° C. yielded a light clear melt. Vigorous evolution of vapor was observed at 175° C. accompanied by a gradual increase in viscosity over a 2 hour heating interval during which the temperature was raised to 190° C. At the end of this period, marked by complete solidification of the mix, the reaction was discontinued.

On cooling the composite product was removed from the resin pot as an ivory, horn-like material which softened on contact with a hot stirring rod. A total weight loss of 5.8 gm. was recorded against a maximum water loss of 5.4 gm. and a maximum acetic acid loss of 3.6 gm. Qualitative examination of the condensate stripped from the nitrogen stream confirmed the presence of acetic acid and to a lesser extent, propionic acid (small fraction boiling over 135° C.). The non-condensable vapors absorbed by the wash water through which the effluent nitrogen stream passed showed an alkaline litmus test and smelled strongly of ammonia.

A 16.07 gm. sample of the composite product was pulverized and leached with four 100 ml. portions of hot (90° C.) distilled water. The insoluble residue was separated from the wash solution by centrifugation, dried in vacuo and yielded 1.46 gm. of light gray, horn-like solid. Yield was 9.0%, of hot water insoluble β-alanine polypeptides.

EXAMPLE 4

*Preparation of poly-β-alanine from N-acetyl-β-alanine and β-alanine (superatmospheric pressure)*

A mixture of β-alanine (0.1 mole, 8.9 gm.) and N-acetyl-β-alanine (0.02 mole, 1.57 gm.) was heated to 190° C. over a 5½ hour period and then to 205° C. for 16 hours, under a pressure of 500 p. s. i. g., in a nitrogen atmosphere. There resulted a white to pale yellow amorphous solid weighing 8.94 gm. and showing no signs of decomposition. The product was removed from the container and a 7.50 gm. quantity of the crude product was leached with hot water, yielding 6.31 gm. of an insoluble, amorphous white solid. On analysis the material showed 19.3 per cent nitrogen. Yield was 84.1% of hot water insoluble β-alanine polypeptides.

The proportion of β-alanine to N-acetyl-β-alanine used may be from about 1 to 10 moles of β-alanine to about 10 to 1 moles of N-acetyl-β-alanine.

EXAMPLE 5

*Preparation of poly-β-alanine from β-alanine methyl ester*

A 100 gm. quantity of β-alanine methyl ester, prepared in known manner, was heated to between 55–65° C. in a nitrogen atmosphere and at atmospheric pressure until sodification of the reaction mass occurred. On analysis this material (dipeptide methyl ester) analyzed 16.3% nitrogen compared to 16.1% for β-alanylalanine methyl ester.

A 4.65 gm. quantity of the dipeptide ester was placed in the glass-lined steel reactor and heated to 200° C. under a nitrogen atmosphere of 500 p. s. i. g. pressure over a 16 hour interval. The amorphous product removed from the liner had darkened slightly and showed a weight loss of 0.80 gm. The maximum weight loss based on the parent dipeptide is calculated at 0.85 gm. A 3.58 gm. sample of the composite product was repeatedly leached with hot water. The hot water-insoluble residue was separated from the wash liquor by centrifugation, collected and dried in vacuo to give 3.1 gm. of insoluble poly-β-alanine analyzing 19.0% total nitrogen. The recovered weight yield amounted to 86.6% of hot water insoluble β-alanine polypeptides.

EXAMPLE 6

*β-Alanine amide condensation*

Approximately 2.3 gm. of β-alanine amide (liquid state, 85% purity) was placed in a resin pot and heated in an oil bath. The first signs of reaction were noted at 110° C. accompanied by a slight darkening of the melt. Thirty minutes of heating at 140° C. produced the first sign of solidification accompanied by increased vsicosity and vapor evolution. Complete solidfication took place at 150° C. whereupon the increased reactivity was manifest in the splattering of the solidified reaction mixture. The product (1.95 gm.), a hard horn-like, light solid, analyzed 20.4% nitrogen, showed a melting point in excess of 270° C. and generally resembled poly-β-alanine synthesized by other methods.

With reference to linear polymer formation from materials from the group consisting of β-alanine alkyl esters, β-alanine amide and amide forming derivatives of β-alanine, an essential and unique part of the procedure comprises the step of initially heating the aforesaid materials under mild conditions to a temperature not in excess of that at which solidification of the reaction mass occurs. At this point, the solid reaction mass has been found to consist substantially of the dipeptide, which is soluble in hot water. After the dipeptide has been formed, there is no longer opportunity for deamination to occur and so the solid dipeptide may be heated under more vigorous conditions, up to about 250° C., until further condensation to hot water insoluble linear polypeptides has been effected. By this means ring formation is prevented since the dipeptide has a unit length of seven (this being the number of atoms between the end groups). This second heating step in an inert atmosphere, may be conducted at subatmospheric, atmospheric or superatmospheric pressures. However, the use of superatmospheric pressures, of up to about 500 p. s. i. g. results in substantially and unexpectedly higher yields than when atmospheric or lower pressures are used.

Insofar as preparing linear polypeptides from such normally solid materials as β-alanine, and mixtures of β-alanine with N-acetyl β-alanine are concerned, these materials, or mixtures thereof are heated in one step to a temperature of up to 250° C. in an inert atmosphere, and preferably a superatmospheric pressure until the desired degree of polymerization has taken place. While such heating may take place at atmospheric or lower pressures, the yields are substantially lower due to the occurrence of decomposition.

The linear polypeptides prepared in accordance with the methods of our invention are horn-like solids, soluble in cresols and the xylenols, but insoluble in hot water. They are also soluble in concentrated hydrochloric acid and may be precipitated on diluting such acid solution, but are susceptible to degradation on long standing or with the application of heat. They consist of poly-β-alanine, as shown by analysis and solubility characteristics, having more than two β-alanine molecules in linear polymer form, and may be used in the preparation of edible films per se or in admixture with plasticizers, or as plasticizers with other film forming edible polymers.

We claim:

1. A process for producing a water-insoluble, non-crystalline linear polypeptide which comprises heating at a temperature in the range of from the melting point to not over about 250° C. in inert gas at superatmospheric pressure, a material selected from the group consisting of β-alanine, a mixture of β-alanine and N-acetyl-β-alanine, the β-alanine dipeptide alkyl esters, and the amide of β-alanine dipeptide, and then separating water-insoluble, non-crystalline, linear polypeptides from the reaction mixture.

2. A method of preparing a linear polymer which comprises heating a β-alanine alkyl ester to a temperature not substantially higher than its boiling point until the reaction mass solidifies, heating the reaction mass at a temperature in the range from the melting point of the solid to not over 250° C. under an inert gas at superatmospheric pressure, and then separating water insoluble polypeptides from the reaction mixture.

3. A method of preparing a linear polymer which comprises heating a β-alanine amide to a temperature not substantially higher than its boiling point until the reaction mass solidifies, heating the solid reaction mass at a temperature in the range from the melting point of the solid to not over about 250° C. under an inert gas at superatmospheric pressure, and then separating water insoluble polypeptides from the reaction mixture.

4. A method of preparing a linear polymer which comprises heating a mixture of β-alanine and N-acetyl-β-alanine to a temperature in the range from the melting point of the mixture to not over about 250° C., under an inert gas at superatmospheric pressure, and then separating water insoluble polypeptides from the reaction mixture.

5. A method of preparing a linear polymer which comprises heating a mixture comprising from about one to ten mols of β-alanine in admixture with from about one to ten mols of N-acetyl-β-alanine to a temperature in the range from the melting point of the mixture to not over 250° C. under an inert gas at superatmospheric pressure.

6. A method of preparing a water-insoluble non-crystalline polypeptide which comprises heating β-alanine to a melting temperature and maintaining said β-alanine material at a temperature at below about 250° C. under an inert gas at superatmospheric pressure until substantial polymerization has occurred, and separating a water-insoluble, non-crystalline peptide from the reaction mixture.

References Cited in the file of this patent

UNITED STATES PATENTS

| Number | Name | Date |
| --- | --- | --- |
| 2,071,253 | Carothers | Feb. 16, 1937 |
| 2,293,388 | Hanford | Aug. 18, 1942 |
| 2,333,752 | Ufer | Nov. 9, 1943 |
| 2,356,516 | Hagedorn | Aug. 22, 1944 |
| 2,500,317 | Lincoln | Mar. 14, 1950 |
| 2,534,283 | MacDonald | Dec. 19, 1950 |
| 2,572,568 | Gluesenkamp | Oct. 23, 1951 |

FOREIGN PATENTS

| Number | Country | Date |
| --- | --- | --- |
| 52,787 | France | June 12, 1944 |

(2nd addition to No. 849,348)

OTHER REFERENCES

Mulder: Berichte der Deut. Chem. Gesel., vol. 9, 1876, page 1904.

Hanson et al.: Journal of Biological Chemistry, vol. 175, 1948, pp. 842, 843.

Abderhalden et al.: Zeitschrift für Physiologische Chemie (Hoppe-Seyler), vol. 178, pp. 169 to 172 (1928); abstracted in Chemical Abstracts, vol. 1929, pp. 99 and 100.